(12) United States Patent
Filippini et al.

(10) Patent No.: US 10,541,005 B2
(45) Date of Patent: Jan. 21, 2020

(54) DISTRIBUTED AND SYNCHRONIZED CONTROL SYSTEM FOR ENVIRONMENTAL SIGNALS IN MULTIMEDIA PLAYBACK

(71) Applicant: Cypress Semiconductor Corporation, San Jose, CA (US)

(72) Inventors: Gianluca Filippini, Cremona (IT); James Dougherty, Morgan Hill, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/921,473

(22) Filed: Mar. 14, 2018

(65) Prior Publication Data
US 2018/0336929 A1    Nov. 22, 2018

Related U.S. Application Data

(60) Provisional application No. 62/507,650, filed on May 17, 2017.

(51) Int. Cl.
| | |
|---|---|
| *G11B 27/28* | (2006.01) |
| *H04N 21/41* | (2011.01) |
| *H04N 21/8547* | (2011.01) |
| *H04N 21/434* | (2011.01) |
| *H04N 21/436* | (2011.01) |

(52) U.S. Cl.
CPC ......... *G11B 27/28* (2013.01); *H04N 21/4131* (2013.01); *H04N 21/4348* (2013.01); *H04N 21/43615* (2013.01); *H04N 21/8547* (2013.01)

(58) Field of Classification Search
None
See application file for complete search history.

(56) References Cited

U.S. PATENT DOCUMENTS

| | | |
|---|---|---|
| 8,984,568 B2 | 3/2015 | Mickelsen et al. |
| 9,019,087 B2 | 4/2015 | Bakircioglu et al. |
| 9,124,954 B2 | 9/2015 | Laksono et al. |
| 9,652,945 B2 | 5/2017 | Levesque et al. |

(Continued)

FOREIGN PATENT DOCUMENTS

EP    3062519 A1    8/2016

OTHER PUBLICATIONS

International Search Report for International Application No. PCT/US18/24822 dated Jun. 14, 2018; 2 pages.

(Continued)

*Primary Examiner* — Hung Q Dang

(57) ABSTRACT

A method includes providing a media dataset including media content data and environmental effects metadata defining a set of environmental events each corresponding to a media timestamp of a plurality of media timestamps. The method further includes, for each environmental event in the set of environmental events, identifying a protocol timestamp for a communication protocol, where the protocol timestamp corresponds to the media timestamp of the environmental event, and generating a message for transmission according the communication protocol, where the message associates the environmental event with the protocol timestamp. The method further includes addressing the message to one or more environmental effect generators.

20 Claims, 9 Drawing Sheets

(56) References Cited

U.S. PATENT DOCUMENTS

| | | | |
|---|---|---|---|
| 9,912,842 B2* | 3/2018 | Lacroix | H04N 5/04 |
| 2002/0167956 A1* | 11/2002 | Moysan | H04N 21/2402 |
| | | | 370/412 |
| 2005/0002525 A1* | 1/2005 | Alkove | H04L 29/06 |
| | | | 380/37 |
| 2006/0233203 A1 | 10/2006 | Iwamura | |
| 2008/0068253 A1 | 3/2008 | Mehta et al. | |
| 2008/0144794 A1 | 6/2008 | Gardner | |
| 2009/0254959 A1 | 10/2009 | Blackwell | |
| 2011/0188832 A1* | 8/2011 | Choi | H04N 21/235 |
| | | | 386/239 |
| 2013/0066623 A1 | 3/2013 | Chou et al. | |
| 2013/0198786 A1* | 8/2013 | Cook | H05B 37/0272 |
| | | | 725/81 |
| 2013/0227410 A1* | 8/2013 | Sridhara | H04N 21/235 |
| | | | 715/702 |
| 2014/0176415 A1* | 6/2014 | Buuck | G06F 3/016 |
| | | | 345/156 |
| 2014/0184749 A1 | 7/2014 | Hilliges et al. | |
| 2014/0270681 A1* | 9/2014 | Sen | G11B 31/00 |
| | | | 386/201 |
| 2016/0150294 A1 | 5/2016 | Phatak | |

OTHER PUBLICATIONS

Written Opinion of the International Searching Authority for International Application No. PCT/US18/24822 dated Jun. 14, 2018; 11 pages.

* cited by examiner

US 10,541,005 B2

DISTRIBUTED AND SYNCHRONIZED CONTROL SYSTEM FOR ENVIRONMENTAL SIGNALS IN MULTIMEDIA PLAYBACK

RELATED APPLICATIONS

This application claims priority to U.S. Provisional Application No. 62/507,650, filed on May 17, 2017, which is incorporated by reference herein in its entirety.

TECHNICAL FIELD

This disclosure relates to the field of multimedia playback devices and, in particular, to environmental effects for multimedia playback.

BACKGROUND

Home theater systems are audio-visual systems that typically include numerous consumer electronic components, such as a large high-resolution display device (e.g., television (TV) screen, projector, etc.), a multiple-channel speaker and audio playback system, and video playback equipment (e.g., set-top boxes, optical disc players, streaming media devices). Such systems allow users to experience movies, music, games, and other media provided from Internet-based subscription streaming services, physical media (e.g., digital versatile discs (DVD) or Blu-ray discs), downloaded files, satellite links, or other sources.

A common configuration for a modern home theater system includes a large flat-screen high-definition television (HDTV) or video projector and a 5.1 or 7.1 channel surround-sound amplifier with multiple speakers placed in different locations around the room, surrounding the user's viewing position. The speaker system typically includes at least one subwoofer to accurately reproduce the low frequency sounds from a movie or music track. The TV device can be a smart TV, which provides integrated Internet and home network access and has the ability to execute applications and obtain and store media content from different sources.

BRIEF DESCRIPTION OF THE DRAWINGS

The present disclosure is illustrated by way of example, and not by way of limitation, in the figures of the accompanying drawings.

DETAILED DESCRIPTION

Figure 1:
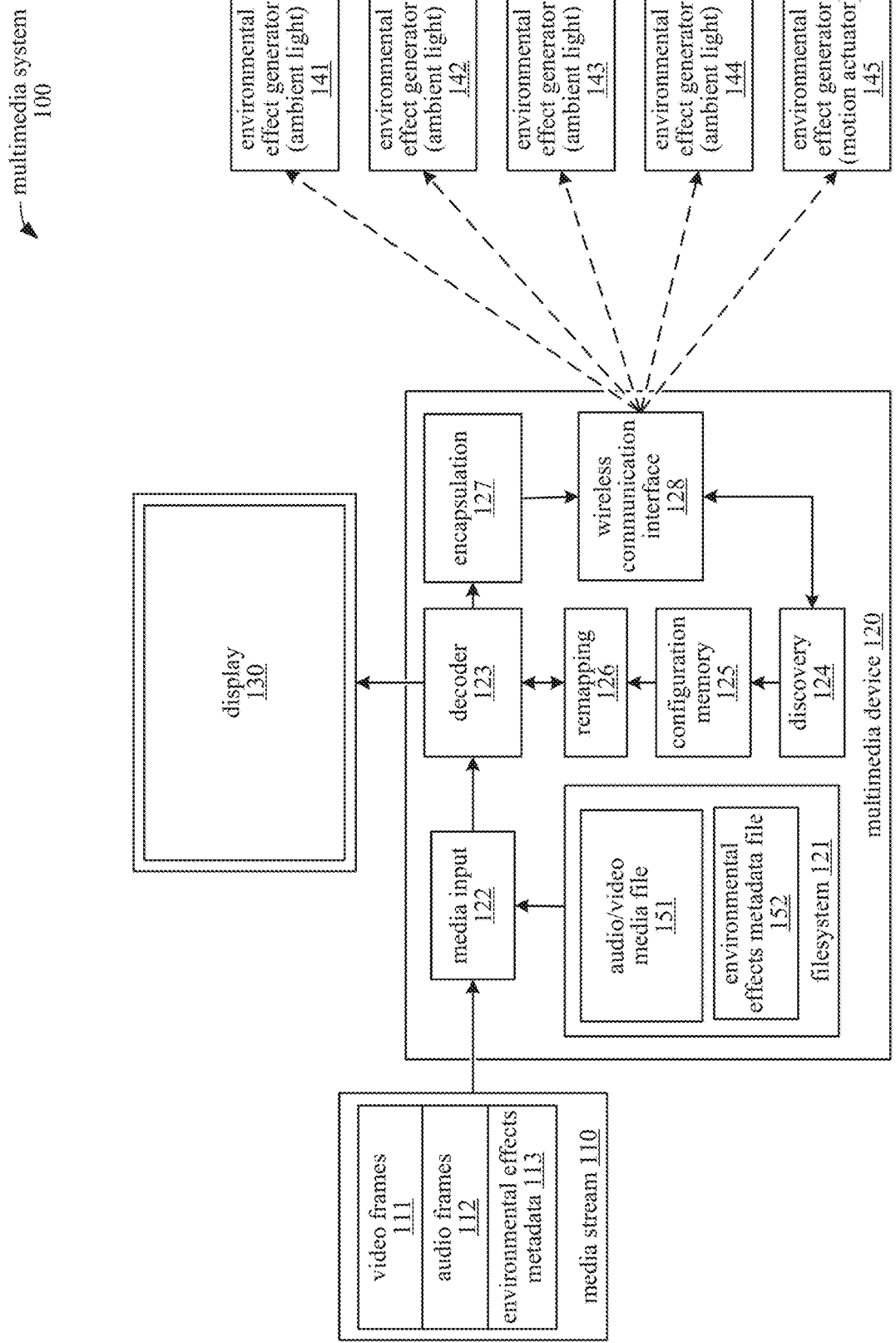
FIG. 1 is a block diagram of a multimedia system, according to an embodiment.

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the scope of the claimed subject matter.

An embodiment of a home theater system includes hardware that produces ambient lighting effects that are displayed contemporaneously with the presentation of video content on a main display, such as a HDTV screen. One approach for providing ambient lighting effects includes generating the lighting effects based on the color and intensity of the video image being displayed on the main display, then projecting the ambient light from light sources in the back of the main display. Using this approach, the ambient light is limited to the back of the main display and is not widely distributed around the entire room environment. In addition, this approach does not provide any mechanism for scripting ambient lighting events or other environmental effects by the original content creator or a third party.

One approach for providing ambient lighting or other environmental effects (e.g., motion actuators, seat shakers, strobe or smoke effects, etc.) that are distributed around the entire viewing room includes multiple environmental effect generators that are placed in different locations around the room. However, this increases the number of components in the system; wired connection of the many separate components (i.e., surround-sound speakers and environmental effect generators) to the main display or to a media content player can result in a large number of wires routed around the room.

In one embodiment, a home theater system that provides visual effects (e.g., ambient lighting) and/or other environmental effects includes multiple environmental effect generators, such as ambient light sources, that are integrated with surround-sound speakers into the same enclosures and are controlled wirelessly from a multimedia device (e.g., HDTV, set-top box, etc.). In such a system, both audio data and directives for controlling the environmental effect generators are transmitted wirelessly, removing the need for signal cabling. The speakers and environmental effect generators are powered by inductively rechargeable batteries to further remove the need for power cabling. In addition, the multimedia device achieves sub-millisecond latency for presenting environmental effect events in synchronization with the playback of media content (e.g., music or movies) by correlating a timestamp associated with the playback of the media content with a timestamp of the wireless communication protocol. Each of the environmental effect generators can be controlled separately so that effects can be localized; for example, different ambient lighting effects can be positioned at different predefined locations and directions in the room. The system thus provides a mechanism by which environmental effects can be widely distributed around a viewing room, synchronized with media content, and authored remotely to be reproduced in the viewing room (e.g., in a user's home).

FIG. 1 illustrates an embodiment of a multimedia system 100 including multiple environmental effect generators 141-145. The multimedia system 100 includes a multimedia device 120 that receives media content (including audio and video content) from a media stream 110 or filesystem 120. The multimedia device 120 decodes the media content and transmits the video data to be presented on a display 130. The multimedia device 120 extracts metadata 113 from the media stream 110 and/or the environmental effects metadata file 152 that defines ideal virtual locations for environmental effect events, then generates directives for generating the specified environmental effects that are transmitted wirelessly to the environmental effect generators 141-145. As illustrated in FIG. 1, the environmental effect generators 141-144 include configurable ambient light sources, and the environmental effect generator 145 includes a motion actuator, which can be used to produce seat rumble or shaker effects, or other types of motion. In alternative embodiments, environmental effect generators can include devices that control the temperature, airflow, humidity, fragrance (e.g., a programmable scent generator), water pressure (e.g., for a fountain), motion or orientation of an entire environment (e.g., a motion simulator), or other characteristics that can be sensed in an environment.

The media dataset is transported by a media stream 110 and includes video and audio data as a sequence of video frames 111 and audio frames 112 that can be replayed by the multimedia device 120. The media dataset also includes the environmental effects metadata 113, which defines environmental events and associates each of these events with a corresponding media timestamp. The media timestamp indicates a time during the playback of the media content (i.e., the audio and video frames 111, 112). In one embodiment, the environmental effects metadata 113 is multiplexed with the video frames 111 and audio frames 112 in a format such as the Moving Picture Experts Group 2 Transport Stream (MPEG2-TS). In one embodiment, the environmental effects metadata 113 can be remultiplexed with existing pre-mastered audio and video streams without re-encoding and re-mastering the audio and video streams (e.g., for media content that is encoded in the MPEG-2 or MPEG-4 formats). The media stream 110 is received via Internet streaming, a satellite or cable TV connection, an optical disc reader (e.g., Blu-ray or DVD), or other source.

Accordingly, an original content creator, such as a movie or TV show producer, can use video editing software to create a sequence of environmental effects encoded in the environmental effects metadata 113 to be replayed along with the video frames 111 and audio frames 112 at predetermined times in the playback timeline. This environmental effects track is multiplexed with its associated audio and video content data and can therefore be distributed together with the audio and video content whether it is distributed by a data stream (e.g., internet streaming) or a physical medium (e.g., data file or optical disk).

In one embodiment, environmental effects metadata 113 is used independently from any video or audio content (e.g., to provide ambient lighting or other effects in an art installation, live performance, or other environment). In this case, environmental effects metadata 113 can be created locally, or created remotely and downloaded as a file or stream via a network, or otherwise obtained. The metadata 113 is synchronized to the local system time and distributed to the environmental effect generators in the environment to create the desired lighting and/or other environmental effects.

Environmental effect sequences can also be produced for gaming systems so that environmental effects can be generated dynamically for interactive three-dimensional (3D) environments. Different environmental effect sequences can be triggered by different in-game events, or by a player's virtual position in a 3D rendered environment. In one embodiment, the environmental effects metadata 113 need not have been produced specifically for the purpose of generating environmental effects; for example, environmental events could be generated based on haptics metadata or control input (e.g., joystick or gamepad) metadata. Accordingly, these types of metadata can also be considered environmental effects metadata 113.

In one embodiment, the multimedia device 120 also includes a filesystem 121 for storing data files. Accordingly, the environmental effects can be defined in an environmental effects metadata file 152 that is stored in the filesystem 121 along with a corresponding audio/video media file 151 that provides the media content for playback. The environmental effects metadata can alternatively be stored in the same file as the audio and video content (e.g., multiplexed according to one of the MPEG formats).

The multimedia device 120 includes a media input 122 that receives a media dataset, including the media content data and the environmental effects metadata 113 from the media stream 110 (or from the files 151 and 152 in the filesystem 121). The media input 122 provides the media dataset to a decoder module 123. The multimedia system 100 includes a display 130 that is connected to the multimedia device 120 and is capable of displaying video. The decoder module 123 extracts the video frames 111 from the media stream 110 and transmits a video signal to the display module 130, which presents the video to the user. In one embodiment, the display 130 is a HDTV; alternatively, the display 130 can be implemented using a projector or other display device. In one embodiment, the display 130 is located in the same physical enclosure as the multimedia device 120; in alternative embodiments, the display 130 is located in a separate enclosure from the multimedia device 120, such as when the multimedia device 120 is implemented in a set-top box, streaming device, home theater personal computer (HTPC) or other separate device. In one embodiment, the playback of video frames on the display 130 can be delayed to accommodate any added latency for processing the environmental effects metadata 113 so that the scripted environmental events can be more easily synchronized with the video playback.

In one embodiment, the positions of the environmental effect generators 141-145 need not exactly match the orientations (i.e., locations and directions) of the environmental events to be generated as defined in the environmental effects metadata 113 or environmental effects metadata file 152. The multimedia device 120 includes a remapping module 126 that computes a set of directives for controlling the environmental effect generators 141-145 to generate an approximation of the ideal set of environmental effects as specified in the environmental effects metadata 113 or environmental effects metadata file 152. For example, the environmental effects metadata 113 may define a virtual ambient light effect ideally oriented at a location where no controllable ambient light source (e.g., 141-144) is actually positioned in the user's room. In order to reproduce the requested ambient light, the remapping module 126 identifies the ambient light sources closest to the defined ideal position and apportions the full intensity of the requested light between the closest actual light sources based on their distances from the ideal position.

In order for the remapping module 126 to perform this remapping process, the discovery module 124 first determines the existence and orientations of each of the environmental effect generators 141-145 that can be controlled from the multimedia device 120. During the discovery process, the discovery module 124 collects information about the effect generation capabilities of the environmental effect generators 141-145. These capabilities can be reported by the environmental effect generators 141-145 themselves via wireless communications received at the wireless communication interface 128 and forwarded to the discovery module 124. The discovery module 124 also collects information about the orientation of each of the environmental effect generators 141-145. In one embodiment, each environmental effect generator 141-145 determines its own orientation (including location and direction) and reports its orientation wirelessly to the discovery module 124. Alternatively, the discovery module 124 can determine the orientations of the environmental effect generators 141-145 without active involvement by the environmental effect generators 141-145, or the discovery module 124 and environmental effect generators 141-145 can cooperate to collectively determine the orientations of all of the environmental effect generators 141-145 (e.g., by signal triangulation, latency measurements, etc.).

In one embodiment where each environmental effect generator includes an ambient light source in the same enclosure as a surround-sound speaker, the position of the ambient light source can be inferred based on the speaker's role (e.g., front-left, front-right, center, etc.) in the surround sound system. This information can be provided to the discovery module 124 by the environmental effect generators 141-145 themselves or configured by a user.

Once the discovery module 124 has determined an orientation for each of the environmental effect generators 141-145, the discovery module 124 stores the orientation information in a configuration memory 125. The configuration memory 125 stores an orientation (including a position and direction) for each of the environmental effect generators 141-145 that can be used by the remapping module 126 to generate approximations for the scripted environmental events.

For ambient lighting effect generators 141-144, the discovery process also determines the light control capabilities for each of the environmental effect generators 141-145. For example, some ambient light sources may be able to produce light within only a certain color range or intensity, or may be able to project light with a certain minimum or maximum beam spread, or within a certain range of directions. These light control capabilities are also used by the remapping module 126 so that actual light sources are not requested to generate lighting effects beyond their respective capabilities. Accordingly, light control capabilities determined during the discovery process are also stored in the configuration memory 125. Capabilities for other types of environmental effect generators (e.g., frequency, intensity, etc. for motion actuator 145) can also be determined and stored in the configuration memory 125. After the discovery process, the discovery module 124 initiates calibration of the environmental effect generators 141-145.

Once the environmental effect generators 141-145 are discovered and calibrated, the decoder module 123 begins to decode the data in the media stream 110 or the files 151 and 152. The remapping module 126 processes the environmental effects metadata 113 or environmental effects metadata file 152 to generate the appropriate directives for controlling the environmental effect generators 141-145 to generate environmental effects approximating the environmental effects requested in the environmental effects metadata 113 or environmental effects metadata file 152. For the ambient light sources 141-144, the remapping module 126 determines which of the ambient light sources 141-144 should be turned on or off, and also determines other parameters for generating the ambient light effects, such as light color, intensity, direction, etc. The remapping module 126 can also determine that certain requested environmental effects are not to be rendered because no environmental effect generator is available to generate the effect at the requested position or intensity.

The remapping module 126 thus identifies a subset of the environmental effect generators 141-145 to be used for generating each environmental event requested in the environmental effects metadata 113 or environmental effects metadata file 152, along with directives for controlling the subset of environmental effect generators, based on the orientation of each of the environmental effect generators 141-145 in the system multimedia system 100 based on the orientation of the environmental event as requested. The directives produced by the remapping module 126 are encapsulated along with timing information in a message to be transmitted wirelessly to the environmental effect generators 141-145. The environmental effects metadata 113 or 152 associates each environmental event with a media timestamp indicating when the environmental event is to be presented during the playback of the audio and video frames 111, 112. For each of the environmental events defined by the environmental effects metadata, the decoder module 123 identifies a protocol timestamp that corresponds to the media timestamp. The protocol timestamp is a timestamp used by a communication protocol; for example, such a timestamp is provided in wireless communication protocols supporting Wi-Fi TimeSync™. In various embodiments, the wireless protocol can be a Wi-Fi protocol, a Bluetooth protocol, or other wireless protocol that either supports or can be modified to support timestamping. In one embodiment, a wired communication protocol (e.g., an Ethernet protocol) can be used instead of a wireless protocol.

For each environmental event specified in the environmental effects metadata 113 or 152, the encapsulation module 127 generates one or more messages for transmission according to a wireless communication protocol that associates the environmental event with the determined protocol timestamp. Specifically, the encapsulation module 127 associates the protocol timestamp with the directives for generating the environmental event (as determined by the remapping module 126) in the generated message.

In one embodiment, where some or all of the environmental effect generators 141-145 are located in the same enclosures with surround-sound speakers of the multimedia system 100, the encapsulation module 127 also includes in the one or more messages one or more audio frames 112 associated with the protocol timestamp to indicate audio to be played back at the same time as the environmental event. The encapsulation module 127 addresses the resulting message or messages (which includes directives and audio frames, each associated with a protocol timestamp) to the one or more environmental effect generators in the subset of environmental effect generators that were identified by the remapping module 126 based on the orientation of the environmental event and the orientations of the environmental effect generators 141-145, as previously described.

The wireless communication interface 128 receives the message from the encapsulation module 127 and transmits the message to the environmental effect generators 141-145. The message thus carries the audio frames and a portion of the original environmental effects metadata 113 (in the form of directives) defining the environmental event to the speakers and environmental effect generators environmental effect generators 141-145, respectively, where they are played back in synchronization with the video displayed by the display 130. In one embodiment, the message is broadcast wirelessly to each of the environmental effect generators 141-145 according to a wireless communication protocol that supports a protocol timestamping mechanism, such as Wi-Fi TimeSync™.

Figure 2A:
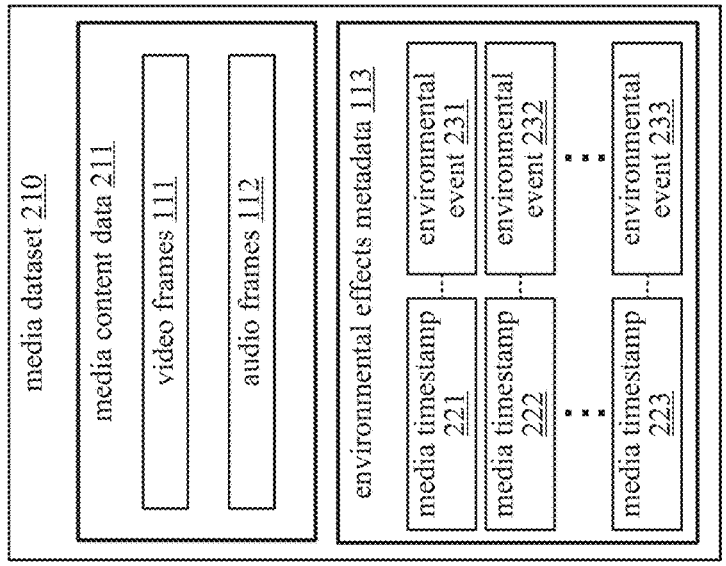
FIG. 2A illustrates a media dataset including environmental effects metadata, according to an embodiment.

FIG. 2A illustrates different types of data in a media dataset 210, according to an embodiment. The media dataset 210 includes media content data 211, which represents the content that the user views, listens to, or otherwise consumes. The media content data 211 includes a sequence of video frames 111 representing video that can be displayed on a monitor, TV, projector, etc. and a sequence of audio frames 112 that represent audio samples for playback at a speaker. In general, each of the audio and video media frames includes a set of samples associated with a media timestamp that identifies a time at which the media frame is to be presented during playback. In one embodiment, the media content data could include speech or other sounds generated in real time (e.g., from a phone or videoconference call), and/or audio generated from alerts, notifications, alarms, etc. The media dataset 210 includes environmental effects metadata 113, which associates each of an arbitrary number of environmental events 231-233 with a respective one of the media timestamps 221-223.

Figure 2B:
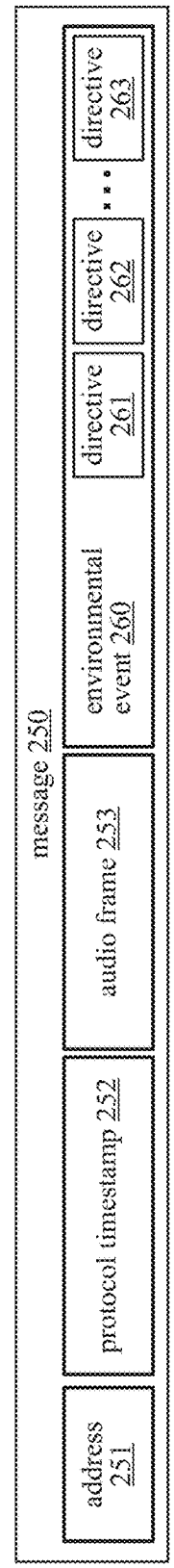
FIG. 2B illustrates a message for transmitting environmental event data, according to an embodiment.

FIG. 2B illustrates a message 250 generated by the encapsulation module 127 and transmitted by the wireless communication interface 128 to the environmental effect generators 141-145, according to an embodiment. The message 250 includes a protocol timestamp 252 that is associated with an audio frame 253 (representing audio samples to be replayed at a time corresponding to the protocol timestamp 252) and an environmental event 260 to be generated at a time corresponding to the protocol timestamp 252. The environmental event 260 is defined in terms of directives 261-263 for controlling an environmental effect generator. The address 251 identifies one of the environmental effect generators 141-145 to which the message 250 is directed (e.g., an environmental effect generator that is capable of generating the environmental event 260). The directives 261-263 are instructions provided to the environmental effect generator for producing the environmental event 260. For example, the directives 261-263 could specify the color, intensity, direction, etc. for an ambient lighting effect. For a motion actuator, the directives 261-263 could specify amplitude, frequency, displacement, direction, duration, etc. of a movement to be generated.

Figure 3:
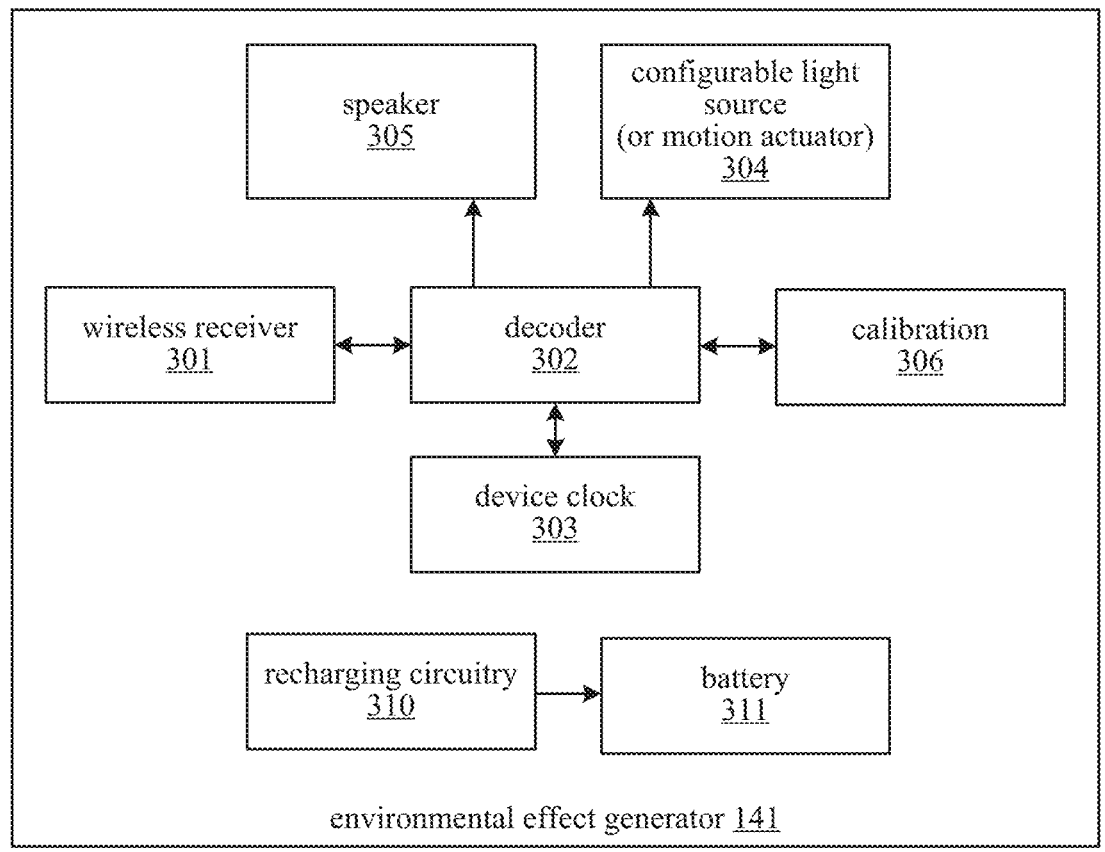
FIG. 3 illustrates a block diagram of an environmental effect generator, according to an embodiment.

FIG. 3 illustrates an environmental effect generator 141, according to an embodiment. The other environmental effect generators 142-145 include similar components as the environmental effect generator 141, except that the environmental effect generator 145 includes a motion actuator instead of a light source 304. The environmental effect generator 141 includes a speaker 305, a configurable light source 304, and power circuitry (including recharging circuitry 310 and a battery 311) for powering the speaker 305, configurable light source 304, and other components in the environmental effect generator 141. In one embodiment, the battery 311 is a rechargeable battery that can be recharged by recharging circuitry 310. In one embodiment, the recharging circuitry 310 includes a coil located near a bottom surface of the environmental effect generator 141 so that the battery 311 can be recharged inductively by placing the environmental effect generator 141 on an inductive charging surface.

The environmental effect generator 141 receives messages wirelessly from the multimedia device 120 via a wireless receiver 301. The wireless receiver 301 determines if a received message 250 is addressed to the environmental effect generator 141 based on the address 251 and if so, transmits the received message to a decoder module 302. The decoder module 302 extracts the audio frame 253 and the directives 261-263 from the message 250, then plays the audio at the speaker 305 and causes the environmental event 260 to be generated at the configurable light source 304 according to the directives 261-263 at the time indicated by the protocol timestamp 252.

In one embodiment, all of the environmental effect generators 141-145 have device clocks that are synchronized with each other so that the presentation of audio and environmental events are synchronized across all of the environmental effect generators 141-145. In one embodiment, the device clock 303 in the environmental effect generator 141 is synchronized with the device clocks in other environmental effect generators using a synchronization mechanism provided by the wireless communication protocol. The device clock synchronization process can thus be based on periodically adjusting the device clock 303 based on detected latencies of wirelessly transmitted messages received from the other environmental effect generators, or by other methods.

Upon receiving the message 250, the decoder module 302 compares the protocol timestamp 252 with the current protocol time as indicated by the device clock 303. If the protocol timestamp 252 specifies a time that is equal to or later than the current protocol time, then the decoder module 302 plays the audio frame 253 at the speaker 305 and causes the configurable light source 304 to generate the environmental event 260 when the protocol timestamp 252 matches the current protocol time (i.e., immediately, or after an appropriate delay). If the protocol timestamp 252 specifies a time that is earlier than the current protocol time, the decoder module 302 discards the message 250.

For an environmental effect generator 141 that includes a configurable light source 304, the calibration process is performed by calibration module 306 to determine a color correction matrix for compensating for colorspace shifting due to changes in the environment. During the calibration process, the calibration module 306 causes the configurable light source 304 to output a known light pattern, which is reflected off the environment. The reflected light is measured, and the calibration module 306 calculates the correction matrix based on the difference between the reflected light and an expected result associated with the known light pattern. The correction matrix is supplied to the decoder module 302. In one embodiment, the decoder module 302 adjusts parameters in the directives 261-263 according to the correction matrix to more accurately reproduce the requested ambient light effect. The configurable light source 304 thus generates light based on the color correction matrix and based on the set directives 261-263 for generating the ambient light effect.

Aside from color correction, the calibration process also compensates for the dynamic range of the light intensity, which can be affected by factors such as the reflectivity of the walls in the viewing room. In one embodiment, this calibration procedure includes commanding all of the available light sources to turn on and off and measuring the maximum and minimum intensity values.

The environmental effect generator 141 as illustrated in FIG. 3 includes a speaker 305; however, in alternative embodiments, an environmental effect generator 141 can include a configurable light source 304 in an enclosure without the speaker 305. Accordingly, the placement of ambient light effect generators is not necessarily restricted to locations where surround sound speakers are located in the viewing room. In addition, some embodiments can include an environmental effect generator that controls a direct light source (e.g., projecting downward from the ceiling, or toward the user), as opposed to ambient light sources that project light laterally onto walls or other surfaces away from the user.

Figure 4:
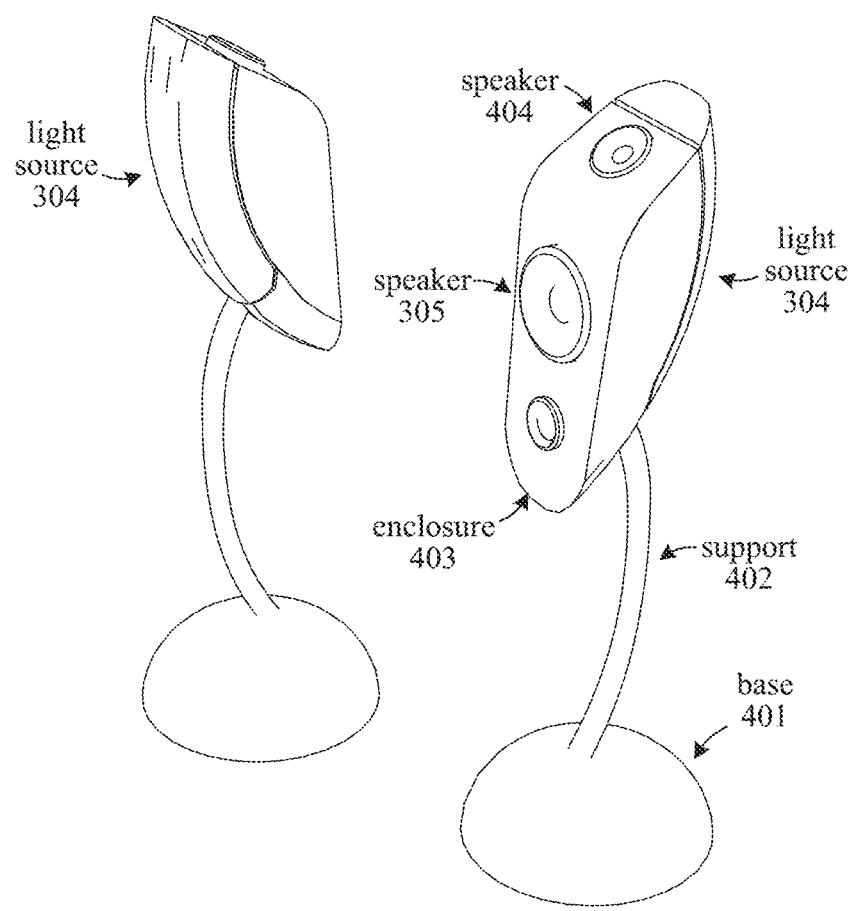
FIG. 4 illustrates two views of an environmental effect generator and speaker assembly, according to an embodiment.

FIG. 4 illustrates two different views of an assembly including a speaker and environmental effect generator, according to an embodiment. The assembly includes a base 401 and an enclosure 403 connected to the base 401 by a support 402. The battery 311 and recharging circuitry 310 are located in the base 401. Speakers 305 and 404 are mounted in the enclosure 403. Speaker 305 is a main speaker for the audio channel and faces toward the front of the enclosure 403, while the speaker 404 is an upfiring speaker that is aimed at an angle from the top of the enclosure 403 for reflecting sound off the ceiling of the room. Light source 304 is a configurable ambient light source that faces toward the back of the enclosure 403, in the opposite direction of the speaker 305. When the main speaker 305 is facing the user, the light source 304 is facing away from the user, toward a wall or other objects from which ambient light can be reflected. The light source 304 covers an area that is curved along multiple axes so that light can be projected over a range of different directions. In one embodiment, the light source 304 internally includes multiple lighting elements, such as light-emitting diodes (LEDs), facing in different directions so that the direction of the light effect can be controlled by controlling the intensities of the different lighting elements. In one embodiment, the light source 304 includes a matrix of red, green, blue, and white (RGBW) LEDs.

Figure 5A:
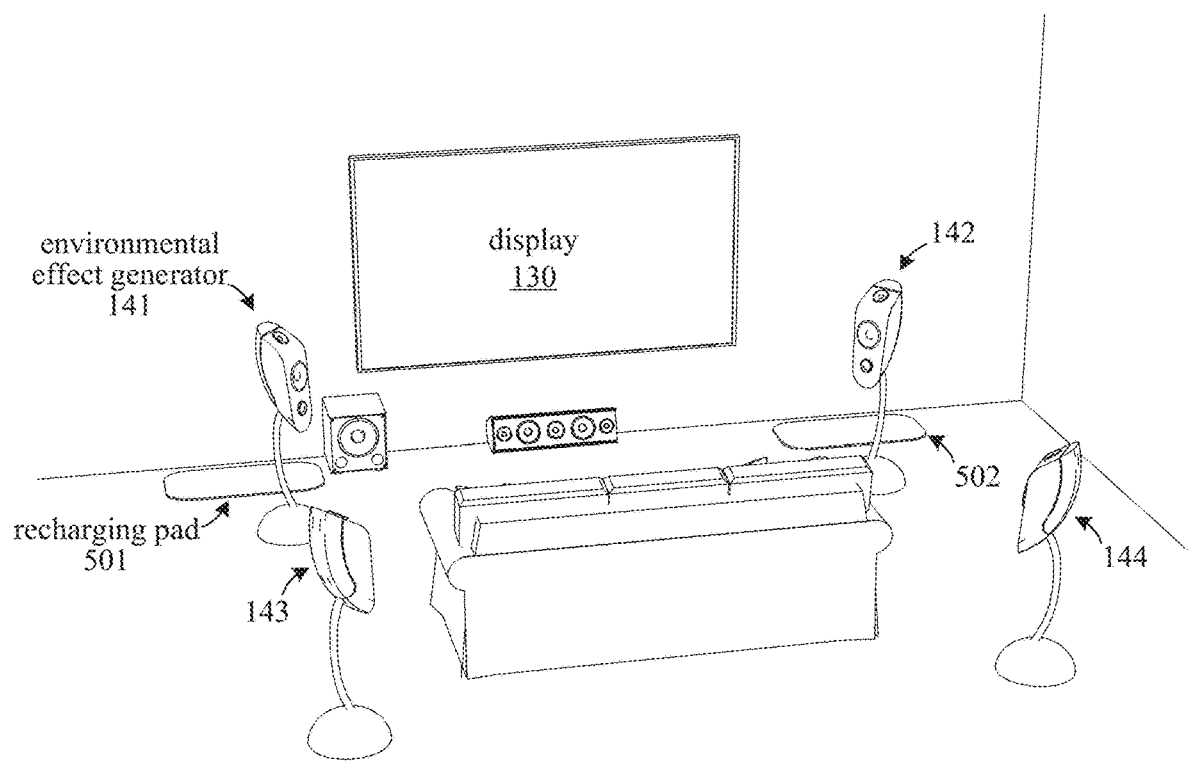
FIG. 5A illustrates playback positions for a set of environmental effect generators in a viewing room, according to an embodiment.
Figure 5B:
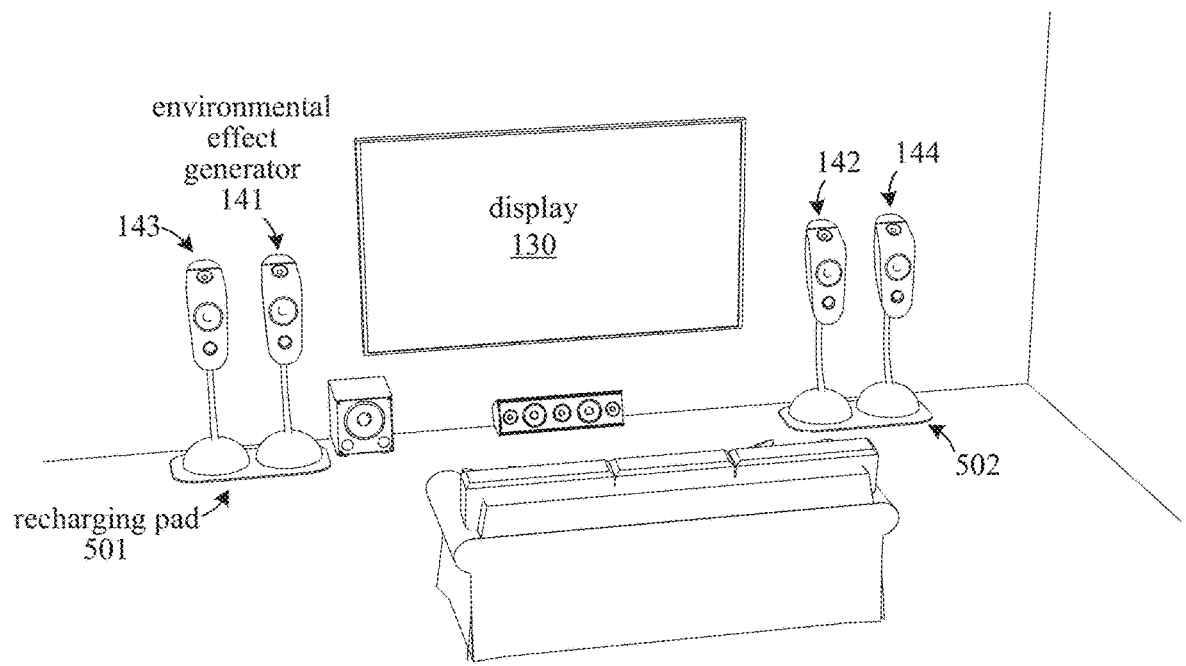
FIG. 5B illustrates recharging positions for a set of environmental effect generators in a viewing room, according to an embodiment.

FIGS. 5A and 5B illustrate playback and recharge positions, respectively, for the environmental effect generators 141-144 and their respective speakers, according to an embodiment. In FIG. 5A, the environmental effect generators 141-144 are positioned optimally for playing back media content (i.e., a movie or music) with scripted ambient lighting effects and/or other environmental effects. The discovery and calibration procedures are performed while the environmental effect generators 141-144 are in this position. FIG. 5B illustrates a recharging position for the environmental effect generators 141-144 in which each of the environmental effect generators 141-144 is placed on an inductive charging surface of one of the recharging pads 501 and 502. The recharging pads 501 and 502 can be located away from high traffic areas of the room so that the environmental effect generators 141-144 do not obstruct foot traffic while they are recharging.

Figure 6:
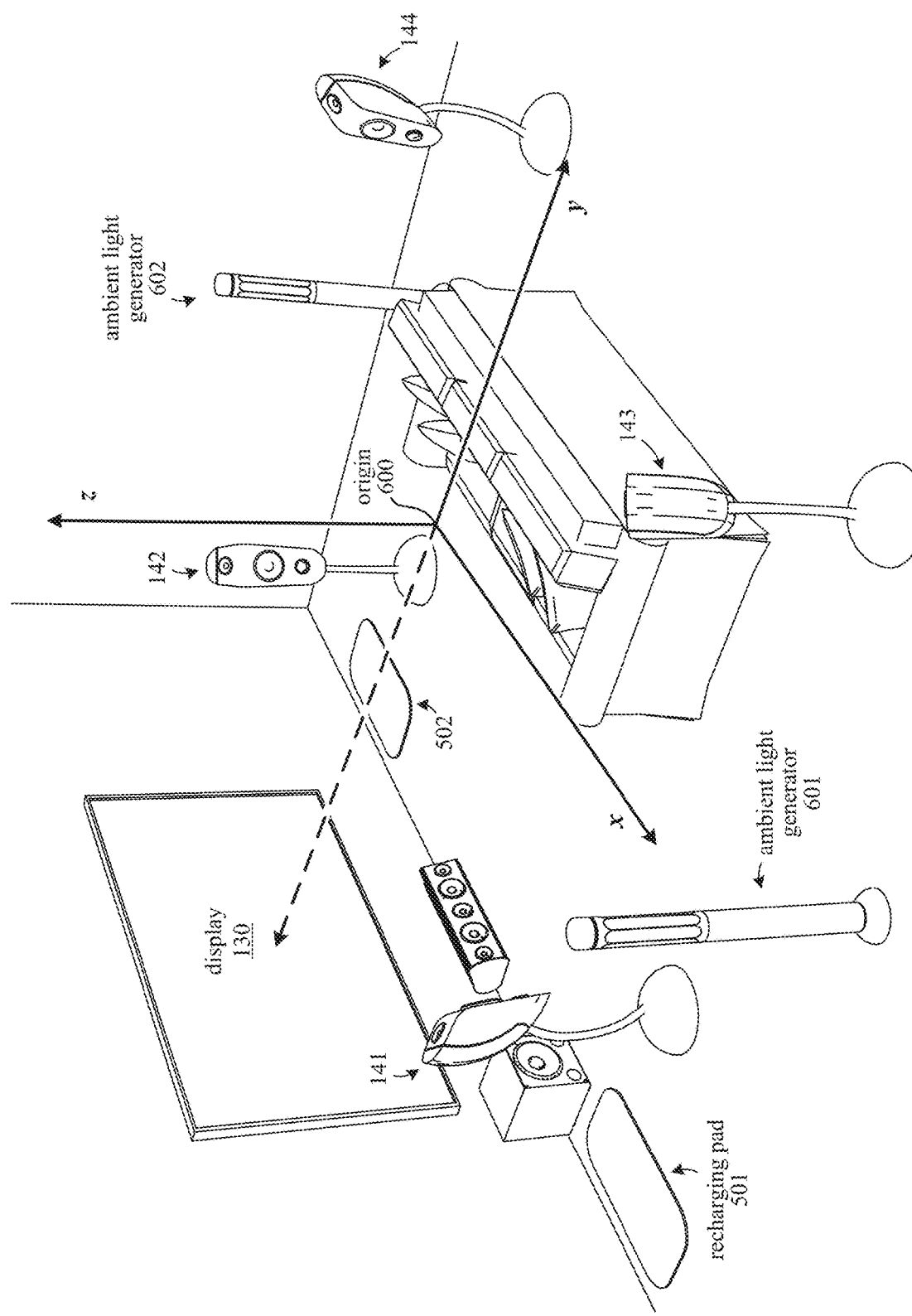
FIG. 6 illustrates a coordinate system for specifying locations in a viewing room, according to an embodiment.

FIG. 6 illustrates a coordinate system for specifying locations of environmental effects (such as virtual light effects) in a layout of a home theater system, according to an embodiment. The coordinate system is illustrated as x, y, and z, axes extending from an origin point 600. The origin 600 approximates the optimal position from which a user of the home theater system views or listens to the video or audio media content. In one embodiment, the origin 600 is at the same height as the center of the display 130, and one axis (in this case, the y axis) is aligned with the user's line of sight to the display 130.

FIG. 6 additionally illustrates standalone ambient light generators 601 and 602, which are environmental effect generators that include configurable light sources and are not attached to any speaker. Since the ambient light generators 601 and 602 are not attached to speakers, they can be more flexibly positioned at locations other than the designated speaker locations in the surround sound system. Similar to the configurable light source 304, the configurable light sources in the ambient light generators 601 and 602 can be similarly configured and recharged. In one embodiment, the ambient light generators 601 and 602 each include a matrix of multiple color LEDs arranged in a curved structure for projecting light in various colors, directions, and beam widths.

Figure 7:
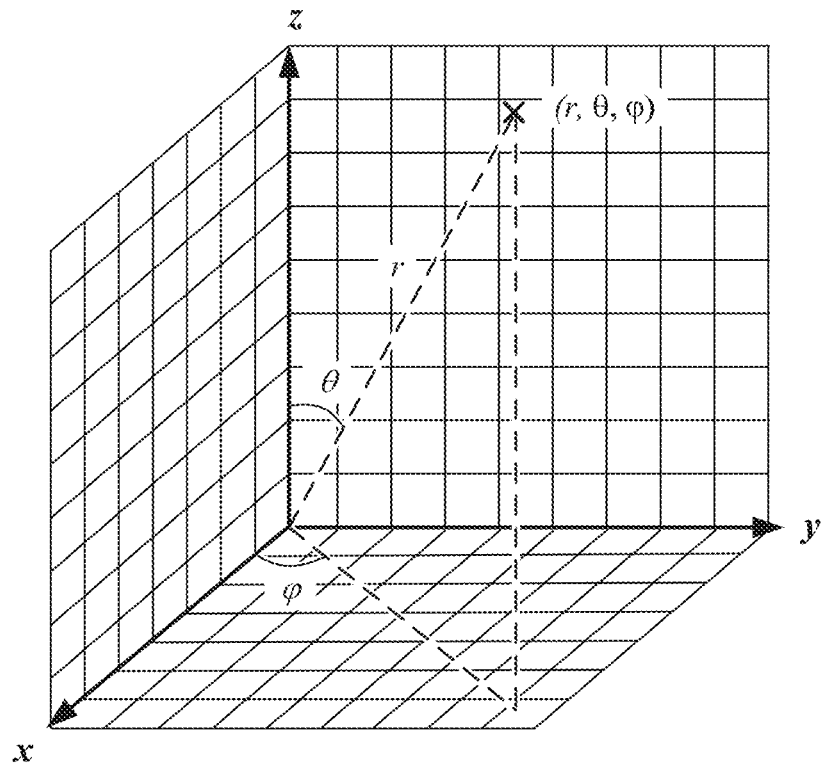
FIG. 7 illustrates a spherical coordinate system, according to an embodiment.

FIG. 7 illustrates a spherical coordinate system in which a position is identified by two angles $\theta$ and $\varphi$, and a distance r, as defined by International Organization for Standardization (ISO) standard ISO 80000-2:2009, and earlier in ISO 31-11 (1992), according to an embodiment. Using the coordinate system, a location can be specified for a virtual light source relative to a fixed position in the viewing room (e.g., the user's optimal viewpoint) as a set of coordinates (r, $\theta$, $\varphi$). In one embodiment, the coordinates for virtual light sources are included as part of the environmental effects metadata 113 in a metadata track. Each set of coordinates defining a location of a virtual light source represents part of the metadata defining an environmental event (e.g., environmental event 231) that is associated with a time in the metadata track (e.g., as indicated by media timestamp 221).

Figure 8A:
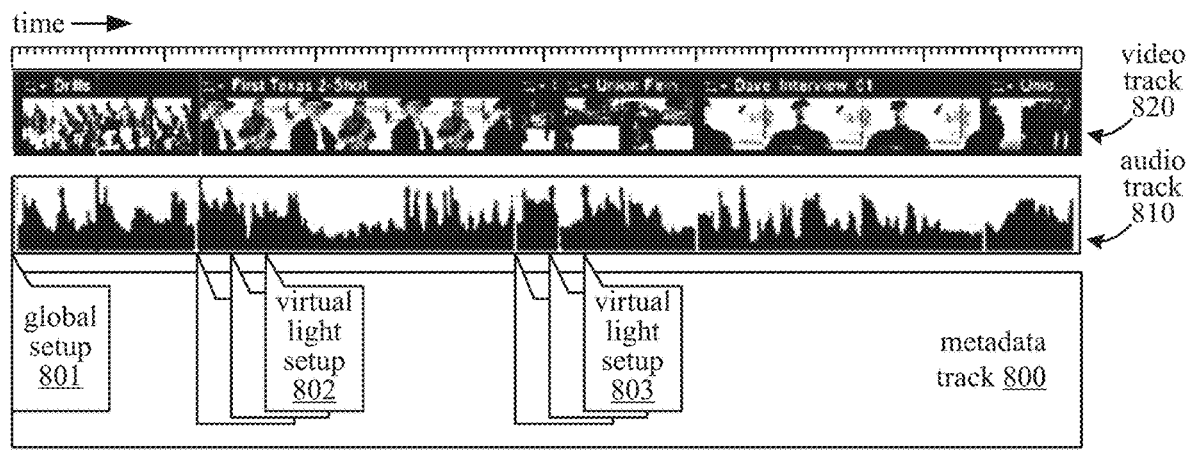
FIG. 8A illustrates media tracks including a environmental effects metadata track, according to an embodiment.

FIG. 8A illustrates a metadata track 800, an audio track 810, and a video track 820, in a media dataset 210, according to an embodiment. In FIG. 8A, time progress from left to right. The illustrated portions of the metadata track 800, audio track 810, and video track 820 are presented contemporaneously over the same period of time. Some media formats (e.g., MPEG2-TS) define an absolute time; thus, the frames or events in the data tracks 800, 810, and 820 have presentation times specified relative to the same absolute timeline. In other words, the events 801-803 defined in the metadata track 800 take place on the same timeline as the video track 820 and audio track 810 playback, so that the events 801-803 consistently occur contemporaneously with the same audio and video frames when the tracks 800, 810, and 820 are replayed. In one embodiment when no external timing track is provided, the events 801-803 are associated directly with specific audio or video frame numbers and are thus consistently triggered contemporaneously with the same audio and/or video frames.

As illustrated, metadata track 800 specifies a global setup event 801 and two sets of virtual light setup events 802 and 803. The global setup 801 and virtual light setup events 802 and 803 represent environmental events in the environmental effects metadata 113 in the original media stream 110. The metadata track 800 defines environmental events generically and is converted by the remapping process performed by remapping module 126 into a specific set of messages for controlling the actual available set of environmental effect generators. In one embodiment, the remapped messages follow the same format as the original messages.

In one embodiment, the global setup event is defined by a global setup message that specifies parameters for defining the color space and the dynamic range of the light intensity (i.e., brightness) for lighting effects to be rendered during the multimedia playback sequence. In one embodiment, the global setup message includes the following directives: transmission time, execution time, color space definition, minimum brightness, and maximum brightness.

The transmission time indicates a time of delivery of the global setup message (e.g., the wireless transmission of the message), while the execution time indicates the time for executing the message (e.g., the time at which the directives in the message are performed in the addressed environmental effect generator). In one embodiment, the execution time is represented by a media timestamp (e.g., 221, 222, 223), which indicates an absolute time in the audio/video playback timeline.

The color space definition in the global setup message indicates a color space for specifying ambient light colors to the environmental effect generators 141-144. Possible color spaces include, but are not limited to, the International Commission on Illumination (CIE) 1931 XYZ color space, the standard Red Green Blue (sRGB) color space (e.g., International Telecommunication Union Radiocommunication Sector (ITU-R) Recommendations BT.709, BT.601, and BT.2020), and the Hue, Saturation, Value (HSV) and Hue, Saturation, Lightness (HSL) color spaces. The color space used by the ambient light source 304 need not be the same color space that is used by the display 130. For example, ultra-high-definition television (UHDTV) displays use the BT.2020 definition, but the ambient light source 304 could be configured to use a different color space such as HSV if the ambient lighting effect creator desires more direct control over brightness. The minimum and maximum brightness values indicate a dynamic range for the ambient lighting effects defined in the metadata track 800.

Once the environmental effect generators 141-144 have been initially configured according to the global setup message, a subsequent virtual light setup message (e.g., corresponding to 802, 803) is used to create a light effect. In one embodiment, the virtual light setup message includes the following directives: transmission time, execution time, a unique light identifier (ID), spherical coordinates, direction, aperture, color coordinates, and a color attack, decay, sustain, release (ADSR) pattern for each color component.

Similar to the global setup message, the transmission time in the virtual light setup message indicates a time of delivery of the virtual light setup message, while the execution time indicates the time for executing the message (e.g., the time at which the directives in the message are performed in the addressed environmental effect generator). In the case of a light setup message, the execution time corresponds to the time that the light effect is generated by the configurable light source and can be seen by the user. In one embodiment, the execution time is represented by a media timestamp (e.g., 221, 222, 223), which indicates an absolute time in the audio/video playback timeline.

In one embodiment, each configurable light source (e.g., 304) renders the light effect specified in one virtual light setup message at a time. If a configurable light source is still rendering a light effect when an execution time for another virtual light setup message is reached, the more recent virtual light setup message supersedes the earlier virtual light setup message. The rendering of the earlier requested light effect is stopped and the configurable light source 304 begins rendering the newly requested light effect, as instructed by the most recently received virtual light setup message.

The unique ID is a 64-bit value that uniquely identifies a virtual light object which is used to refer to the virtual light during playback time. The unique ID is unique along the entire multimedia playback sequence, but is not necessarily unique among IDs for virtual light objects in different multimedia sequences.

In the virtual light setup message, the spherical coordinates are represented as a set of coordinate values $(r, \theta, \varphi)$ that indicate a spatial position for the virtual light effect in the room space, relative to the optimal viewing position of the user. This position represents an ideal location of the light effect, which may be remapped to the specific set of available configurable light sources by the remapping module 126. The direction value in the virtual light setup message indicates whether the virtual light effect should be directed outwards (e.g., toward the walls of the room) or inwards (e.g., toward the viewer). The aperture value indicates a width of the light beam in degrees, allowing lighting effects to be specified such as spot lights or wide omnidirectional lights.

The color coordinates in the virtual light setup message indicate a color for the requested light effect, using the color system defined by the color space definition in the global setup message. These color coordinates also define the brightness of the virtual light effect. The ADSR pattern specified for each color in the virtual light setup message indicates how the intensity of each color of the lighting effect changes over time.

In one embodiment, the configurable light source 304 is capable of displaying a light pattern (e.g., having multiple pixels). Accordingly, a virtual light setup message can additionally specify an image for generating a lighting effect that can be projected onto surfaces in the room or viewed directly. In one embodiment, a specified image has a lower resolution than the video played on the main display 130. In one embodiment, a sequence of such lighting effect images is transported in a sub-track of the main video format (and is thus compressed using the same compression protocol as the main video data). The sub-track is cross referenced to a queue of outgoing virtual light setup messages, so the images are included in outgoing virtual light setup messages as they are received.

Figure 8B:
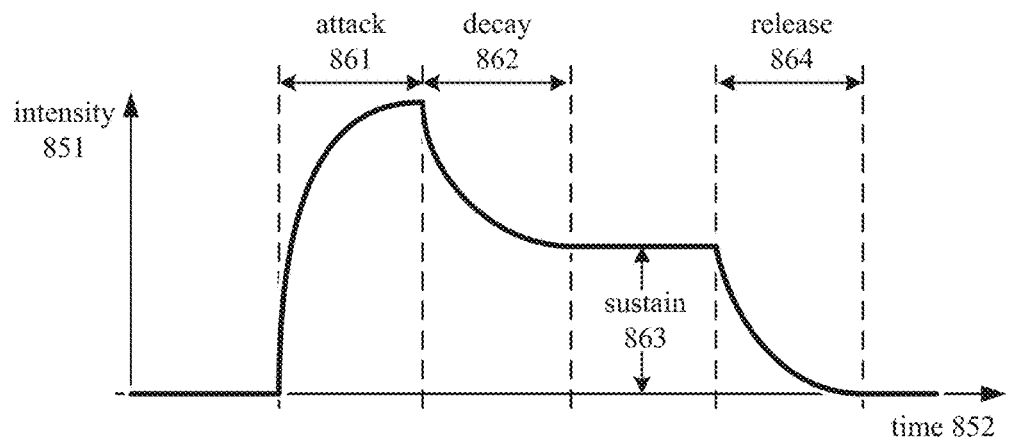
FIG. 8B illustrates an attack, decay, sustain, release (ADSR) profile, according to an embodiment.

FIG. 8B illustrates an ADSR profile, according to an embodiment. In the virtual light setup message, each color component of the color coordinates is associated with four ADSR values: attack 861, decay 862, sustain 863, and release 864, which define the increase and decrease in intensity 851 of that color component over time 852. The attack value 861 indicates the duration over which the intensity 851 of the color component increases, while the decay value 862 indicates the duration over which the intensity 851 decreases to an intensity level indicated by the sustain value 863. The release value 864 indicates the duration over which the intensity 851 of the light decreases to zero. When the same ADSR values are defined for each of the red, blue, and green color components of a RGB light, the light changes in brightness while maintaining the same hue. Changes in hue over time can be effected by using different ADSR values for different color components.

Figure 9:
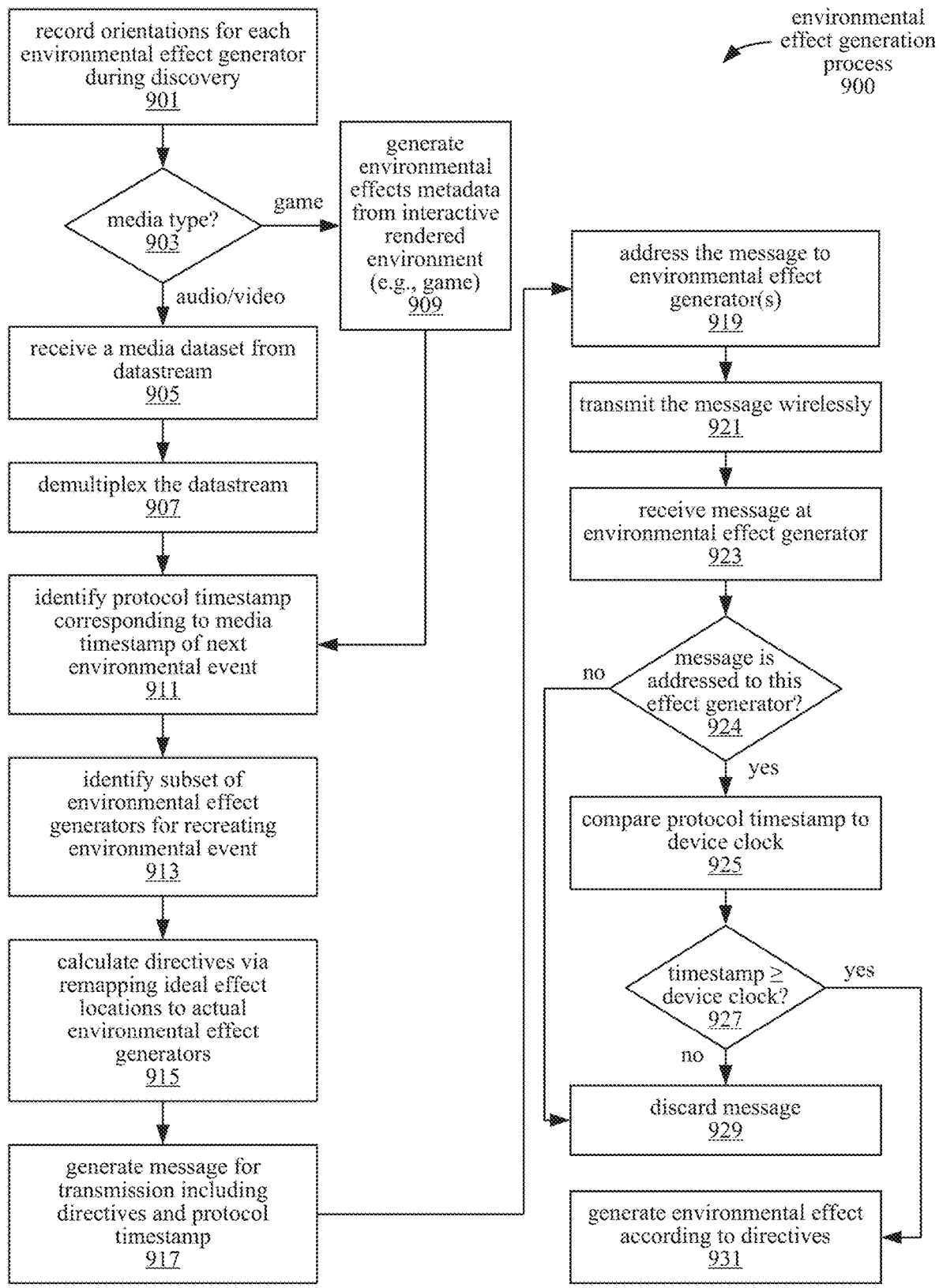
FIG. 9 illustrates a process for generating environmental effects, according to an embodiment.

FIG. 9 illustrates a process 900 for generating environmental effects based on environmental effects metadata, according to an embodiment. The operations in the environmental effect generation process 900 are performed by the components of the multimedia system 100, including the multimedia device 120 and the environmental effect generators 141-145.

At block 901, the discovery module 124 in the multimedia device 120 performs a discovery process to determine the orientations and capabilities of each of the environmental effect generators 141-145 in the system 100. The orientation of each environmental effect generator includes a position of the environmental effect generator and a direction of the environmental effect generator. In one embodiment, the orientation for each environmental effect generator in the room is recorded as coordinates (r, θ, φ) in a spherical coordinate system having an origin 600 at a user's optimal viewing location, as illustrated in FIG. 6.

At block 903, if the media type being played in the multimedia system 100 is audio or video media, the process 905 continues at block 905. Audio and video media include music, movies, television shows, etc. At block 905, the multimedia device 120 receives a media dataset at the media input 122 from a media datastream 110. Alternatively, the media dataset can be retrieved as files 151 and 152 from a filesystem 121 of the multimedia device 120. The media dataset is received at a media input 122, which represents a communication interface (e.g., an Internet connection, internal bus, etc.) at which the media dataset can be received.

The media dataset includes media content data, which includes media frames (e.g., video frames 111 and audio frames 112) that can be played in sequence to produce audio or video. The media dataset also includes environmental effects metadata 113, which defines a set of environmental events 231-233. Each of the environmental events 231-233 corresponds to a respective media timestamp 221-223. Each of the video frames 111 and audio frames 112 is also associated with a media timestamp, which indicates the temporal sequence in which the frames should be played back. The media content (including the audio and video data) and the environmental effects metadata 113 are multiplexed together into a single datastream 110 or file using a file format such as, for example, MPEG2-TS or MPEG4. At block 907, the decoder 123 of the multimedia device 120 demultiplexes the datastream 110 or file so that the audio 112, video 111, and environmental effects metadata 113 can be processed and presented differently.

In one embodiment, the multimedia system 100 also supports computer rendering of interactive three-dimensional (3D) environments, such as video gaming applications. At block 903, if the media type is a game or other 3D rendered experience, the process 900 continues at block 909. At block 909, the multimedia system 100 generates environmental effects metadata based on the interactive representation of the 3D environment. In one embodiment, the environmental effects metadata is generated in a personal computer or gaming console separate from the multimedia device 120. Alternatively, the environmental effects metadata can be generated in the multimedia device 120. In one embodiment, the environmental effects metadata defines lighting effects and/or other environmental effects that mimic the virtual in-game environment.

From block 907 or block 909, the process 900 continues at block 911. At block 911, the decoder module 123 identifies a protocol timestamp that corresponds to a media time stamp for the next environmental event 231 in the stream 110 (or file 152). The protocol timestamp is a timestamp used by a communication protocol to attach timing information to messages.

At block 913, the remapping module 126 begins a remapping process to allow the set of environmental effect generators 141-145 to approximate the environmental event 231. At block 913, the remapping module 126 identifies a subset of the environmental effect generators 141-145 for generating the environmental event 231 based on the orientation of the environmental event 231 and also based on the orientation and capabilities of each environmental effect generator 141-145. For example, for an environmental event that defines a virtual light source where no actual configurable light source is present, the remapping module 126 could identify a subset of environmental effect generators that are capable of producing light that are nearest to the ideal location of the virtual light source. The remapping module 126 can then apportion the light intensity between the nearest environmental effect generators according to their respective distances from the ideal location of the virtual light source.

At block 915, the remapping module 126 generates new directives for controlling the one or more environmental effect generators in the identified subset based on the remapping of the ideal environmental effect locations to the orientations and capabilities of the actual environmental effect generators in the room. The directives are commands for causing the environmental effect generators in the identified subset to generate the requested environmental event 231 in conjunction with each other. Directives can command a light source (e.g., 304) to generate light having a certain color, intensity, direction, etc.

At block 917, the encapsulation module 127 generates a message 250 for transmission according to the wireless communication protocol. The generated message 250 associates the environmental event 260 with a protocol timestamp 252, and includes the directives 261-263 for causing an environmental effect generator (e.g., 141) to generate the environmental event 260. When the environmental event is an ambient light effect, the directives 261-263 specify parameters for controlling a configurable light source 304 in the environmental effect generators 141. The message 250 also associates at least one audio frame 253 with the protocol timestamp 252. At block 919, the encapsulation module 127 addresses the message 250 to the environmental effect generator 141 by indicating an address for the environmental effect generator 141 in the address field 251 of the message 250.

At block 921, the wireless communication interface 128 transmits the message 250 wirelessly to the environmental effect generators 141-145. The audio frame 253 and the portion of the environmental effects metadata 113 defining the environmental event 260 (in the form of remapped directives 261-263) are thus transmitted to the environmental effect generators 141-145. In one embodiment, the message 250 is broadcast to all of the environmental effect generators 141-145.

At block 923, the message 250 is received at the environmental effect generator 141. The message 250 is received at a wireless receiver 301 of the environmental effect generator 141. At block 924, if the message 250 is not addressed to the environmental effect generator 141, then the message 250 is discarded at block 929. At block 924, if the message 250 is addressed to the environmental effect generator 141, the process continues at block 925. At block 925, the decoder 302 compares the protocol timestamp 252 associated with the environmental event 260 with a clock value indicated by the device clock 303. At block 927, if the protocol timestamp 252 is greater than or equal to (i.e., indicates the same time or a later time then) the device clock value, then the process 900 continues to block 931.

At block 931, the decoder 302 performs the directives 261-263 to cause the configurable light source 304 to generate the requested lighting effect for generating the environmental event 260. In one embodiment, the wireless protocol timestamp is capable of sub-millisecond accuracy so that the rendering of the environmental event at the environmental effect generator 141 takes place within one millisecond prior to or after the presentation of a media frame (e.g., and audio or video frame) associated with the same media timestamp of the environmental event. Accordingly, lighting effects and other environmental effects can be synchronized with audio and/or video events with sub-millisecond accuracy so that any timing error is imperceptible to humans.

At block 927, if the protocol timestamp is less than (i.e., indicates an earlier time than) the clock value from the device clock 303, then the message 250 is stale and is discarded at block 929. By this mechanism, the environmental effect generator 141 avoids the late rendering of environmental effects.

In the process 900, blocks 911-921 are repeated for each of the environmental events 231-233 defined in the environmental effects metadata 113, so that the sequence of environmental events 231-233 is recreated contemporaneously with the playback of the media content 211. Each environmental event 231-233 can be remapped to generate a single message or multiple messages including directives for controlling a specific subset of the environmental effect generators 141-145 to generate an approximation of the generically defined environmental effects. Thus, an authored sequence of environmental effects can be approximately recreated even when the specific orientations of the environmental effect generators is not known at the time of the authoring. The system thus provides a mechanism by which environmental effects can be widely distributed around the viewing room, synchronized with media content, and authored remotely to be reproduced in the viewing room (e.g., in a user's home).

In the foregoing embodiments, various modifications can be made; for example, signals described as being asserted with a high voltage may instead be asserted with a low voltage, or specified components can be replaced with other components having similar functionality. As described herein, conductive electrodes that are "electrically connected" or "electrically coupled" may be coupled such that a relatively low resistance conductive path exists between the conductive electrodes. Quantities, dimensions, or other values described as "substantially" equal may be nominally equal but need not be exactly equal (with variations due to manufacturing tolerances, environmental conditions, quantization or rounding error, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the claimed subject matter has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method, comprising:
providing a media dataset comprising media content data and environmental effects metadata defining a set of environmental events each corresponding to a media timestamp of a plurality of media timestamps; and
for each environmental event in the set of environmental events,
correlating a media playback time indicated by the media timestamp of the environmental event with a device clock value in each of one or more environmental effect generators by identifying a protocol timestamp that corresponds to the media timestamp of the environmental event,
remapping a position defined in the environmental effects metadata for the environmental event to actual positions of two or more of the one or more environmental effect generators,
generating a message for transmission according a communication protocol, wherein the message reflects the remapping and associates the environmental event with the protocol timestamp, and
addressing the message to one or more environmental effect generators.

2. The method of claim 1, wherein:
the communication protocol is a wireless communication protocol, addressing the message to the one or more environmental effect generators is based on an orientation of the environmental event, and the method further comprises wirelessly transmitting the message for each environmental event to a set of environmental effect generators including the one or more environmental effect generators.

3. The method of claim 2, wherein:

the media content data comprises a plurality of audio frames;

the message associates one or more of the plurality of audio frames with the protocol timestamp; and the method further comprises transmitting in the message the one or more audio frames and a portion of the environmental effects metadata describing the environmental event.

4. The method of claim 1, wherein the media content data comprises a plurality of media frames, and wherein the method further comprises, for each environmental event in the set of environmental events, generating the environmental event at the one or more environmental effect generators within one millisecond prior to or after presenting a media frame associated with the media timestamp corresponding to the environmental event.

5. The method of claim 1, further comprising:

for each environmental effect generator of the one or more environmental effect generators, storing an orientation of the environmental effect generator, wherein the orientation of the environmental effect generator comprises a position of the environmental effect generator and a direction of the environmental effect generator;

for each environmental event in the set of environmental events, identifying a subset of the environmental effect generators for generating the environmental event based on the orientation of the environmental event and an orientation of each environmental effect generator in the one or more environmental effect generators; and for each environmental effect generator in the subset:
calculating a set of one or more directives for generating the environmental event in conjunction with other environmental effect generators in the subset based on the orientation of the environmental effect generator and the orientation of the environmental event, and transmitting the set of one or more directives to the environmental effect generator.

6. The method of claim 1, further comprising:

receiving the media dataset as a data stream at a communication interface, wherein the media content data comprises a plurality of video frames each associated with one of the plurality of media timestamps, and wherein the plurality of video frames and the environmental effects metadata are multiplexed in the data stream; and demultiplexing the data stream.

7. The method of claim 1, further comprising generating the environmental effects metadata based on an interactive representation of a three-dimensional environment.

8. The method of claim 1, further comprising, for each environmental event in the set of environmental events:

receiving the message at an environmental effect generator of the one or more environmental effect generators;

comparing the protocol timestamp associated with the environmental event with a clock value generated by a device clock of the environmental effect generator; and in response to determining that the protocol timestamp is equal to or later than the clock value, generating the environmental event based on one or more directives in the message.

9. The method of claim 1, wherein for each environmental event in the set of environmental events, the generated message specifies one or more directives for controlling a light source in one of the environmental effect generators, wherein the one or more directives indicate at least one of a color, an intensity, and a direction of light to be generated by the light source.

10. A multimedia device, comprising:

a media input configured to provide a media dataset comprising media content data and environmental effects metadata defining positions for a set of environmental events each corresponding to a media timestamp of a plurality of media timestamps;

a decoder module configured to, for each environmental event in the set of environmental events, correlate a media playback time indicated by the media timestamp of the environmental event with a device clock value in each of one or more environmental effect generators by identifying a protocol timestamp that corresponds to the media timestamp of the environmental event;

a remapping module configured to, for an environmental event in the set of environmental events, compute a remapping of the defined position for the environmental event to actual positions of two or more of the one or more environmental effect generators;

an encapsulation module configured to, for each environmental event in the set of environmental events,
generate a message for transmission according to a communication protocol, wherein the message reflects the remapping and associates the environmental event with the protocol timestamp, and address the message to the one or more environmental effect generators; and a communication interface configured to transmit the message.

11. The multimedia device of claim 10, further comprising a display module configured to display the media content, wherein the media content comprises video data.

12. The multimedia device of claim 10, wherein:

the communication protocol is a wireless communication protocol, the encapsulation module is configured to, for each environmental event in the set of environmental events, address the message to the one or more environmental effect generators based on an orientation of the environmental event, and the communication interface is further configured to wirelessly transmit the message for each environmental event to a set of environmental effect generators including the one or more environmental effect generators.

13. The multimedia device of claim 12, wherein:

the media content data comprises a plurality of audio frames;

the message associates one or more of the plurality of audio frames with the protocol timestamp; and the communication interface is further configured to transmit in the message the one or more audio frames and a portion of the environmental effects metadata describing the environmental event.

14. The multimedia device of claim 10, further comprising:

a configuration memory configured to, for each environmental effect generator of the one or more environmental effect generators, store an orientation of the environmental effect generator, wherein the orientation of the environmental effect generator comprises a position of the environmental effect generator and a direction of the environmental effect generator; and a remapping module configured to, for each environmental event in the set of environmental events,
identify a subset of the environmental effect generators for generating the environmental event based on the orientation of the environmental event and an orientation of each environmental effect generator in the one or more environmental effect generators, and
calculate a set of one or more directives for generating the environmental event in the subset of the environmental effect generators based on the orientation of each environmental effect generator in the subset and the orientation of the environmental event, wherein the communication interface is further configured to, for each environmental effect generator in the subset, transmit the set of one or more directives to the environmental effect generator.

15. The multimedia device of claim 10, further comprising the one or more environmental effect generators, wherein each environmental effect generator of the one or more environmental effect generators comprises:
a wireless receiver configured to receive the message for each environmental event in the set of environmental events;
a device clock synchronized with each of one or more device clocks in the other environmental effect generators of the one or more environmental effect generators; and
a configurable light source configured to generate the environmental event in response to determining that the protocol timestamp is equal to or later than a clock value generated by the device clock.

16. The multimedia device of claim 10, wherein for each environmental event in the set of environmental events, the generated message specifies one or more directives for controlling a light source in one of the environmental effect generators, wherein the one or more directives indicate at least one of a color, an intensity, and a direction of light to be generated by the light source.

17. A system, comprising:
an input configured to receive environmental effects metadata defining positions for each of a set of environmental events, wherein each environmental event specifies a visual effect;

a decoder module configured to, for each environmental event in the set of environmental events, correlate a media playback time indicated by a media timestamp of the environmental event with a device clock value in each of one or more environmental effect generators by identifying a protocol timestamp for a communication protocol;

a remapping module configured to, for an environmental event in the set of environmental events, compute a remapping of the defined position for the environmental event to actual positions of two or more of the one or more environmental effect generators; and an encapsulation module configured to, for each environmental event in the set of environmental events, generate a message for transmission according to the communication protocol, wherein the message associates the protocol timestamp with the environmental event.

18. The system of claim 17, further comprising:
a set of one or more speakers;
the set of one or more environmental effect generators each located in the same enclosure as one of the speakers; and
a communication interface configured to:
wirelessly transmit the message to at least one of the environmental effect generators, and
wirelessly transmit audio data to the set of one or more speakers.

19. The system of claim 17, wherein:
the input is configured to receive the environmental effects metadata in a media dataset comprising media content data, wherein each environmental event in the set of environmental events corresponds to a media timestamp of a plurality of media timestamps for the media content data;
the protocol timestamp corresponds to the media timestamp of the environmental event; and
the encapsulation module is further configured to address the message to the one or more environmental effect generators.

20. The system of claim 17, wherein the encapsulation module is configured to, for each environmental event of the set of environmental events, address the message to the one or more environmental effect generators based on an orientation of the environmental event.

* * * * *